United States Patent
Evangelista et al.

(10) Patent No.: US 6,506,274 B1
(45) Date of Patent: Jan. 14, 2003

(54) APPARATUS AND METHOD FOR MANUFACTURE OF TIRES

(75) Inventors: Marc Evangelista, Greer, SC (US); William Steiner, Simpsonville, SC (US); David Bailey, Oplika, AL (US)

(73) Assignee: Michelin Recherche et Technique, S.A. (CH)

( * ) Notice: Subject to any disclaimer, the term of this patent is extended or adjusted under 35 U.S.C. 154(b) by 0 days.

(21) Appl. No.: 09/359,837

(22) Filed: Jul. 23, 1999

Related U.S. Application Data
(60) Provisional application No. 60/098,329, filed on Aug. 28, 1998.

(30) Foreign Application Priority Data

Jul. 23, 1998 (FR) .............................. 98 09594

(51) Int. Cl.$^7$ .............................. B29D 30/32
(52) U.S. Cl. ............... 156/132; 156/131; 156/133; 156/135; 156/398; 156/400; 156/417
(58) Field of Search ................. 156/131, 132, 156/133, 135, 398–403, 417; 152/539, 541, 550, 545

(56) References Cited

U.S. PATENT DOCUMENTS

| | | | |
|---|---|---|---|
| 1,911,594 A | 5/1933 | Swern | |
| 2,605,198 A | 7/1952 | Haase | |
| 2,951,526 A | 9/1960 | Haase | |
| 3,784,426 A | * 1/1974 | Woodhall et al. | ........... 156/132 |
| 5,971,047 A | * 10/1999 | Drieux et al. | ................ 152/539 |

FOREIGN PATENT DOCUMENTS

| | | | |
|---|---|---|---|
| DE | 2511160 | 9/1976 | |
| EP | 0953434 | 11/1999 | |
| EP | 0953435 | 11/1999 | |
| FR | 2777826 | 10/1999 | |
| FR | 2777827 | 10/1999 | |
| GB | 1040271 | 8/1966 | |
| JP | 4-250029 A | * 9/1992 | ................. 156/133 |

OTHER PUBLICATIONS

Cordaillat et. al.; application No. 09/299/229; Filing Date: Apr. 23, 1999.
Cordaillat et. al.; application No. 09/299/128; Filing Date: Apr. 26, 1999.

* cited by examiner

Primary Examiner—Geoffrey L. Knable
(74) Attorney, Agent, or Firm—E. Martin Remick; Martin Farrell; Alan Csontos

(57) ABSTRACT

An apparatus for manufacture of a tire, the apparatus including a drum with shoulder having a generally cylindrical main receiving surface to receive the products to be assembled, the main receiving surface being radially retractable. The drum has a shoulder axially to the side edges of said main receiving surface. The drum is mounted on a shaft. At least one associated axially movable side crown is mounted coaxially with the drum. The drum has a lateral protuberance coaxially juxtaposed to at least one of its shoulders. The side crown is axially slidable at least partly under the lateral protuberance, the lateral protuberance forming a quasi-cylindrical support surface whose outside diameter is smaller than the diameter of the main receiving surface. The side crown has a substantially cylindrical outer surface capable of passing axially outside of the lateral protuberance.

11 Claims, 17 Drawing Sheets

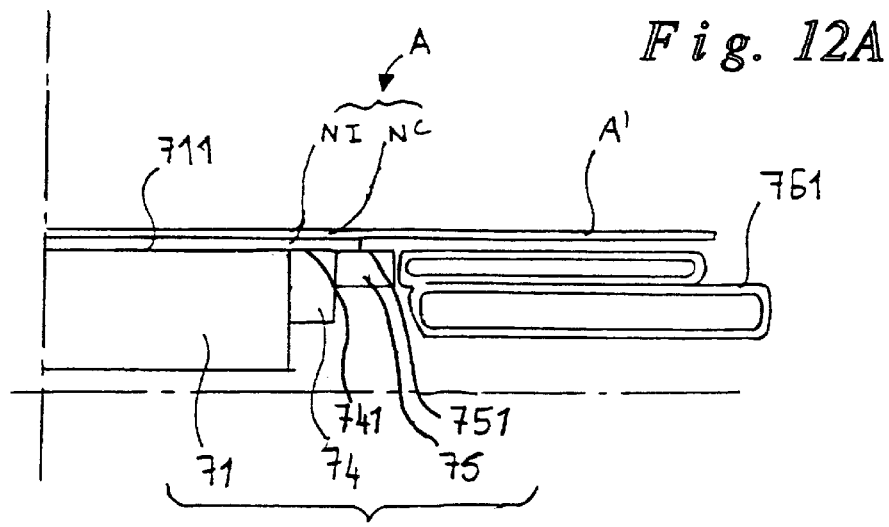
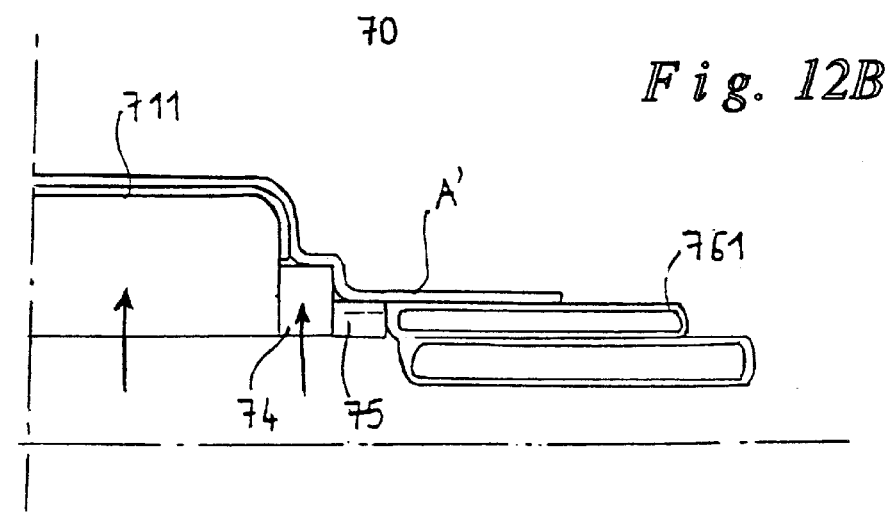
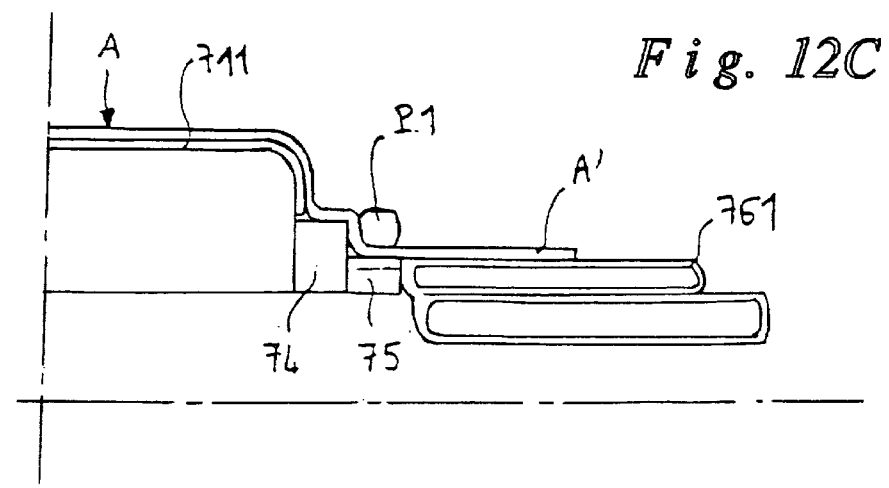

APPARATUS AND METHOD FOR MANUFACTURE OF TIRES

CROSS-REFERENCE TO RELATED APPLICATIONS

This application claims the benefit of U.S. Provisional Application No. 60/098,329, filed Aug. 28, 1998, and claims the benefit of French Application No. 98/09594, filed Jul. 23. 1998.

BACKGROUND OF THE INVENTION

The present invention relates to a process of tire manufacture and assembly drums serving to practice the process.

The invention relates more specifically to the manufacture of tires comprising a casing carcass and at least one reinforcing bead wire in each of the beads, around which the casing carcass is rolled forming a fold such that, contrary to common practice, the fold of the casing carcass is arranged between the bead wire and the casing carcass itself.

Some manufacturing processes employ assembly drums comprising shoulders, in particular, against which the wire is brought by describing an axial movement. The wire is held against the shoulder by simple adhesion between the materials or by an additional means. Such drums may employ bead wires directly, or separately fabricated semifinished products consisting of the bead wire surmounted radially by a section of rubber composition. Hereinafter, the term "bead wire complex" will be used to mean a bead wire alone, a bead wire surmounted by a section of rubber composition, optionally further comprising a coating compound for the bead wire filler such as another rubber composition section or a rubber ply comprising cords.

By way of example, mention may be made of publication FR 1,397,751, describing such an assembly drum with shoulders having a single working position, non-expanding, for rolling the casing, and a (radially) retracted position for axially extracting the tire casing produced. The bead wire complexes are laid on each shoulder during fabrication of the casings respectively and held in place by an axially displaceable accessory means.

Such drums serve for tire fabrication by process steps consisting of:

Positioning the casing carcass on the drum with its ends axially passing beyond the surface of the drum, Applying said ends against the shoulders of the drum, generally with the aid of axially displaced depressing fingers, Then positioning the bead complexes against the shoulders of the drum, Finally, actuation of folding means generally consisting of inflatable envelopes to lift the ends of the casing carcass and thus fold the carcass around said complexes without changing their positioning.

Thus it is not possible, with such drums, to arrange the fold of the casing carcass between the bead and the carcass itself. Actually, this method cannot fold the ends of the casing carcass under the bead complexes when the latter are already in position against the casing.

The object of the invention, then, is to manufacture a tire by using bead wire complexes in which the casing carcass fold is positioned between the bead wire and the said casing carcass.

SUMMARY OF THE INVENTION

According to the invention, the tire manufacturing process comprises the following steps:

Laying a casing carcass on a generally cylindrical main receiving surface, at least one side end of the casing carcass being laid vertically to and overhanging a first cylindrical support surface coaxial with and of smaller diameter than the main receiving surface, laying a rubber composition section on said end of the casing carcass, folding said end around the rubber composition section, while keeping the said section substantially stationary, laying a bead wire complex on the fold so made and axially to the inside of the place where the section is laid.

In practice, the two sides of the drum are designed alike, so that the other one of the lateral ends of the casing carcass is likewise placed vertically to and overhanging another first cylindrical support surface, arranged axially on the other side, likewise coaxial with and of smaller diameter than the main receiving surface.

Advantageously, the folding of the end of the casing carcass around the rubber composition section is performed:

By lifting said end radially so that it is oriented substantially radially,

Then bringing the bead wire complex axially towards the center of the casing carcass until the casing end rests on the bead wire complex And continuing the axial approach of the bead wire complex, which passes over the rubber composition section.

More specifically, the end of the casing carcass is lifted radially by pressing radially outward in an area of said end located axially outside the rubber composition section.

Further, the invention proposes a process for manufacturing a tire, comprising the following steps:

Laying a casing carcass on a generally cylindrical main receiving surface, at least one of the side ends of the casing carcass being laid vertically to a first cylindrical support surface coaxially with the main receiving surface.

Laying a section of rubber composition on said end of the casing carcass.

Folding said lateral end around the section of rubber composition while keeping said section substantially stationary.

Laying a bead wire complex on the folds so made, axially to the interior of the place where the section is laid.

As mentioned above, in practice, the two lateral ends of the casing carcass are subjected to manipulations, if not identical at all points (since it may be that tires are to be produced whose bead wire diameters are not the same in each fold), at least similar in principle.

DESCRIPTION OF THE DRAWINGS

Other features and advantages of the invention will appear upon reading the variant embodiments of the invention with reference to the accompanying drawing, in which:

FIGS. 12A to 12F are schematic representations in partial axial section illustrating the several phases of the manufacture of a tire with the apparatus according to the fourth embodiment of the invention.

DESCRIPTION OF THE PREFERRED EMBODIMENTS

Figure 1:
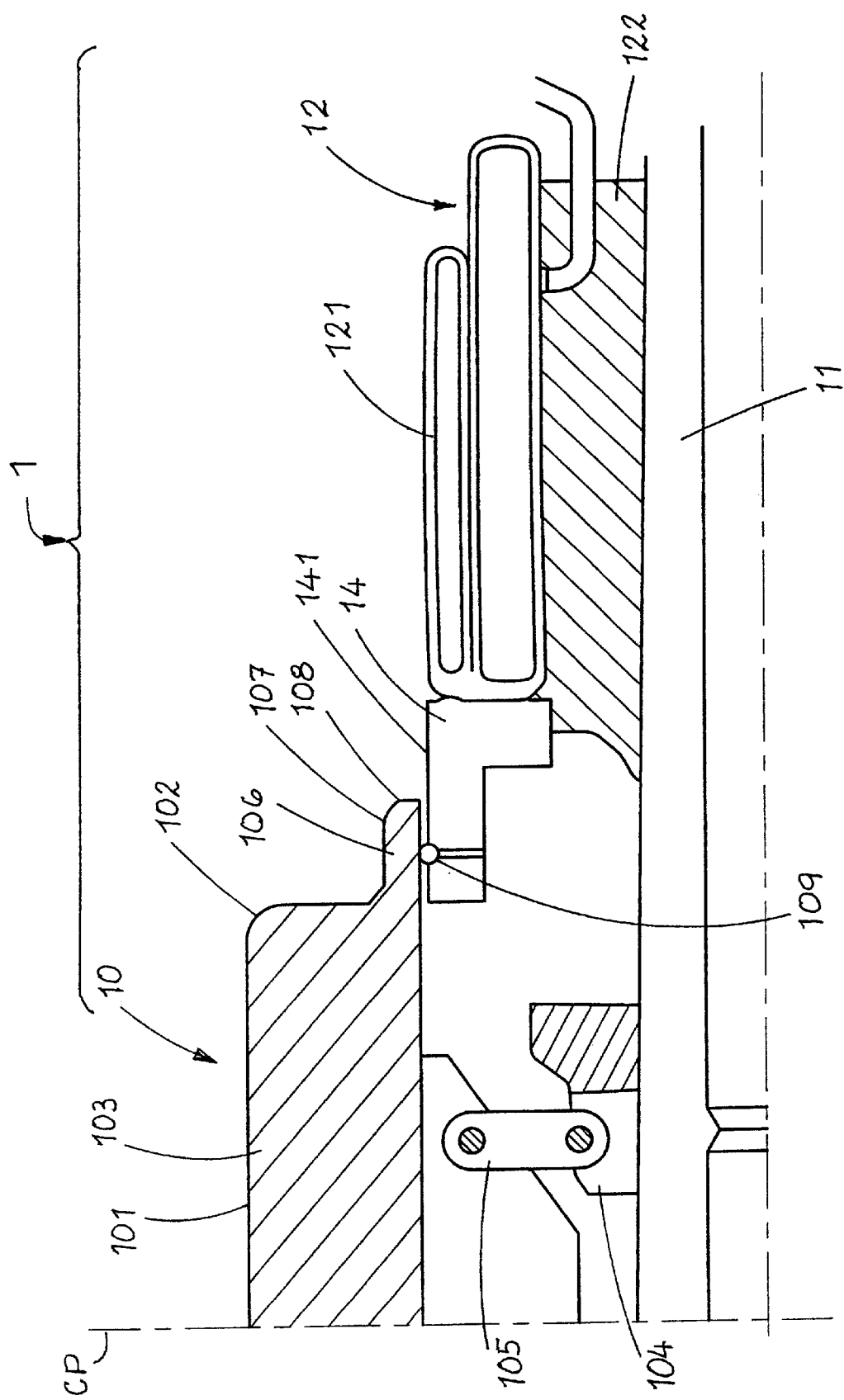
FIG. 1 is a partial axial section of a tire manufacturing apparatus according to a first embodiment of the invention.

Various types of apparatus for practicing the invention are proposed below. Throughout the description, parts common to the several modifications will be designated by the same reference numerals. In the light of this description, those skilled in the art may quite readily construct symmetrical or asymmetrical apparatus. To set forth the idea of the invention, it will suffice to explain one axial half in detail. The following, therefore, will be limited to a description of the portion of the apparatus located to the right of the plane CP in the various figures.

As mentioned elsewhere, the invention may likewise be used to advantage when the rims of the tire are symmetrical, or when they are of different diameters.

The apparatus 1 comprises an assembly drum 10 mounted on a shaft 11, a folding device 12, a means (not shown) of bringing the axially displaceable bead wire complex towards and away from the drum 10 while leaving clear the inside space of the bead wire complexes. The bead wire complex approach means may for example be in the form of a ring with hook fingers holding the bead wire complex, or a ring with magnetic engagement, or else a crown. The apparatus moreover includes a means comprising depressor fingers 13, indicated in FIG. 4B. This last may be integrated with the bead wire complex approach means.

The folding means 12 arranged axially outside the drum 10 comprises a support 122 slide mounted on the central shaft 11. The folding means 12 also comprises inflatable membranes 121, borne by the said support 122. In place of said membranes, one may also conceive of using a folding means essentially comprising lifting fingers. Such means will be described in more detail in the course of the description referring to FIGS. 5 and 6.

The assembly drum 10 has a generally cylindrical main receiving surface 101 and at least one shoulder 102. The receiving surface 101 is made up of circumferentially juxtaposed segments 103 in working position of the drum, mounted by way of links 105, radially displaceable relative to supports 104, mounted on shaft 11. The segments 103 permit radially retracting the drum 10 so that casings made on the said drum can be (axially) extracted. Thus, the segments 103 form a system of several circumferentially adjacent segments.

Figure 2:
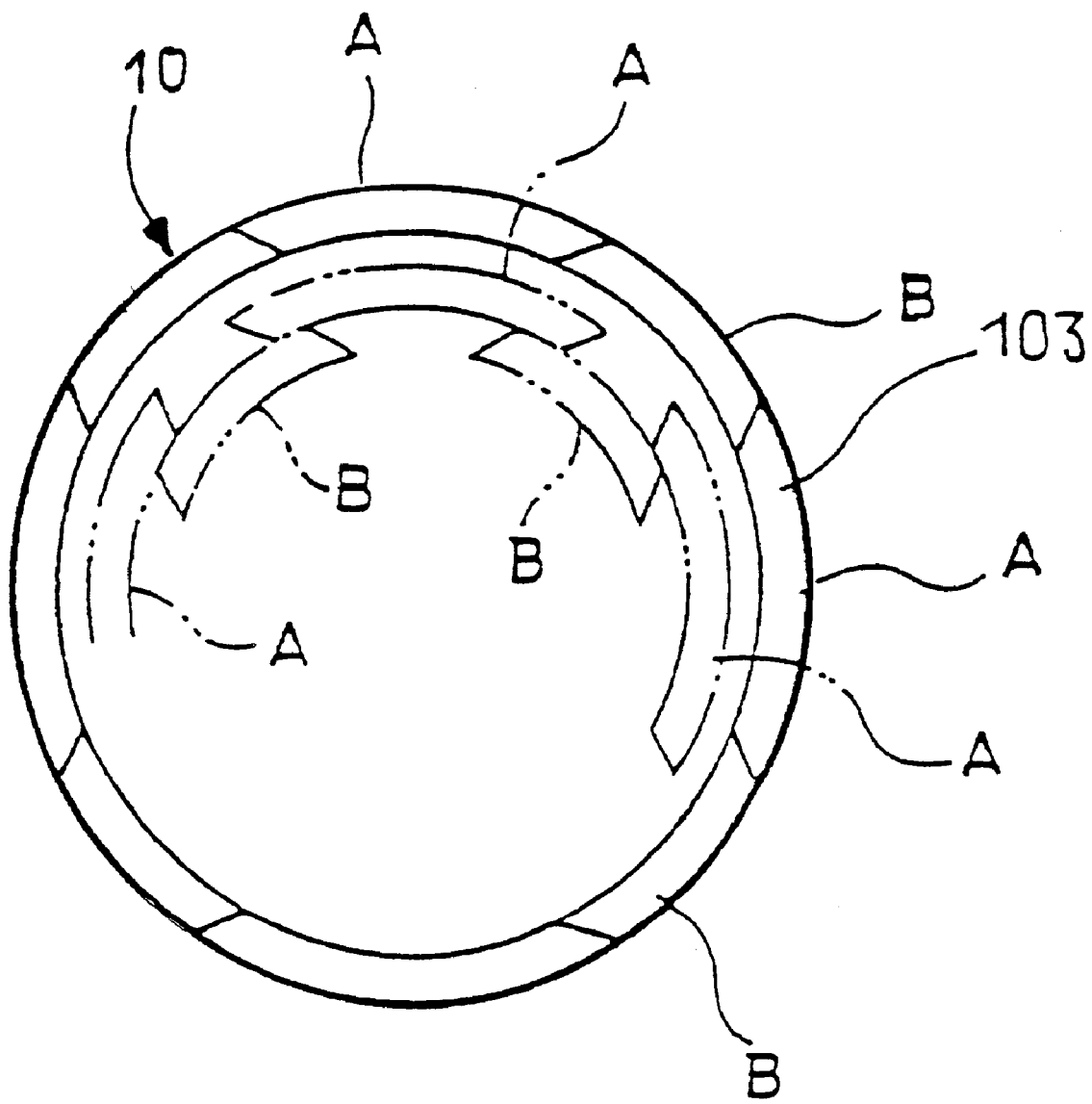
FIG. 2 is a partial section, according to the plane CP, of the drum of the apparatus represented in FIG. 1.

Thus, the segments 103 constitute a system of several circumferentially adjacent segments, the circumferentially lateral faces of some (B) being convergent inside the drum (conventionally, let us call them the "arches"), and the circumferentially lateral faces of others (A) converging to the outside of the drum (conventionally, the "keys"). This enables the arches to be first displaced radially towards the inside, as shown in FIG. 2. Thus, in said FIG. 2 the segments 103 in working position of the drum 10 are shown in solid lines, while the successive segments A and B form a continuous cylindrical surface, and the same segments A and B in retracted position are shown in dotted lines, the envelope formed by the surfaces of the segments B being of smaller diameter than that formed by the surfaces segments A.

Thus the drum 10 has only one radial working position assembling a tire casing and one retracted position for extraction of the casing.

The drum 10 further comprises a lateral protuberance 106 integral with said drum 10 and fixed to the latter, with a generally cylindrical support surface 107 of smaller diameter than the main receiving surface 101, so that the shoulder 102 remains clear in order to allow the bead wire complex to be laid on said shoulder by a lateral approach.

Note that the forms of the radial section of the segment 103, that is, the shape of the outer surface consisting of the main receiving surface 101 as extended by the shoulders 102, may vary somewhat. For example, it may be less square to the shoulders, as shown for example in U.S. Pat. No. 1,911,594. That is, the shoulders may be slightly inclined to the radial direction, without having any portion contained in a plane perpendicular to the axis. Seen in radial section, the shoulders are then leaning somewhat, while still having rounded edges.

Figure 3:
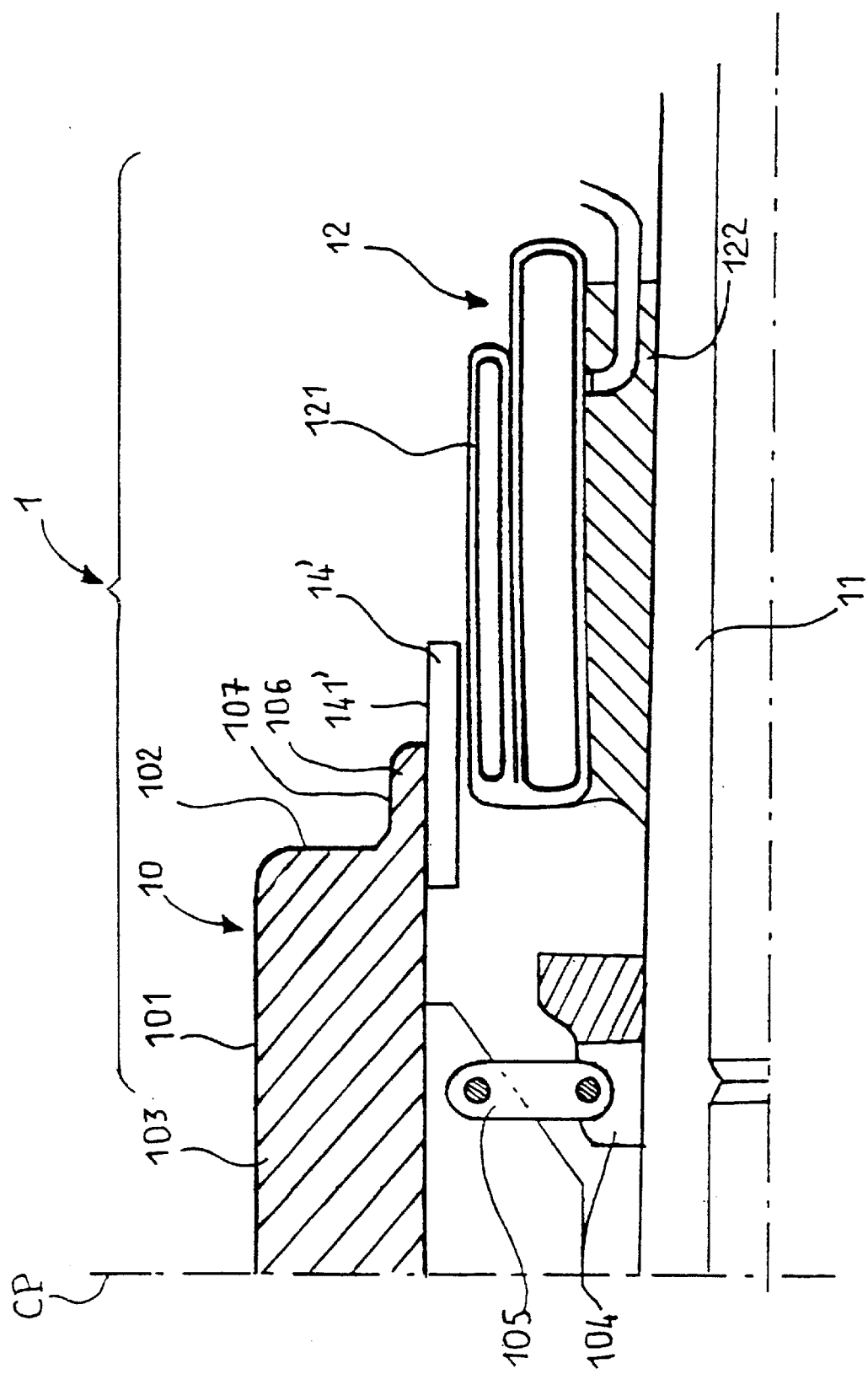
FIG. 3 is a partial axial section of the apparatus according to a modification of the first embodiment of the invention.

As is shown by FIGS. 1 and 3, the apparatus 1 also comprises a side crown 14 (14') coaxial with said drum 10, having a generally cylindrical support surface 141 (141') of smaller diameter an that of the lateral protuberance 106. This side crown 14 (14') is mounted on shaft 11 and is axially movable in relation to drum 10, as explained below.

According to the modification shown in FIG. 1, the side crown 14 is mounted on the folding means 12 axially inward in relation to the center of the apparatus 1 and is integral in axial translation with said means. The diameter of the support surface 141 of the side crown 14 is less than the inside diameter of the segments 103 in their working position, so that it will retract beneath said segments. Thus the axial displacement of the folding means 12 enables the side crown 14 to be actuated between a transversely advanced position, shown in FIG. 1, where it goes axially beyond the drum 10, and a retracted position in which the side crown 14 is concealed by the drum 10.

According to a second embodiment of the apparatus shown in FIG. 3, the side crown 14' is mounted on the assembly drum 10 radially beneath the lateral protuberance 106, and capable of axially translation relative to the segments 103 between an advanced position in which it goes axially beyond the lateral protuberance 106 over the folding means 12 and a retracted position under the lateral protuberance 106. This arrangement permits modulation of the length of the membrane actually used for folding, the side crown 14' being capable, at the time of the axial sliding motion, of partly covering the folding means. Thus, upon expansion of the folding membranes 121, the side crown 14' being in advanced position, the membranes do not act upon the products laid on the lateral protuberance 106, as will be seen in more detail in the description of the process of manufacture.

Note that if it is desired to make a tire having two beads of different diameters with a casing carcass fold between the bead wire and the carcass for each bead, an apparatus asymmetrical with respect to the plane P can be provided, so that the crown and lateral protuberances respectively arranged on either side of the plane P will present support surfaces of different diameters, conforming of course on either side of said plane to the relative arrangement of crown and lateral protuberance as previously described.

The various means employed to control the rotation of the various parts of the apparatus around the axis of rotation require no detailed explanation. Be it noted simply that it is desirable to control the rotation not only of the drum 10 but preferably also of the folding means 12, since it also serves as a surface for placement of various constituents of the tire to be fabricated. The rotational drive of the folding means 12 may derive directly from the shaft 11, or the folding means may be engaged on the drum 10 as required, for example by an inflatable tubular chamber 109 inserted on the support surface 141 on the axially inner side thereof. The folding means 12 will then be engaged by inflation.

In the following, for the first embodiment of the invention, with reference to FIGS. 4A to 4J, the process of manufacture of a passenger car tire with radial casing carcass will be described, comprising a casing carcass, at least one reinforcing bead wire in each of the beads of said tire, and more specifically the formation of one of said beads in which the casing carcass forms a fold arranged between the bead wire and the casing carcass itself.

Of course, the process of manufacture will serve alike to make a tire having a single bead of the type described above or two beads of that type, and the selected example of a passenger car tire with radial casing does not limit the invention to that type of tire.

FIGS. 4A to 4J schematically illustrate the process in the first embodiment of the invention according to the first modification of the apparatus 1 shown in FIG. 1, the operation of the process with the second modification of the apparatus 1 being easily deduced from the former.

Figure 4A:
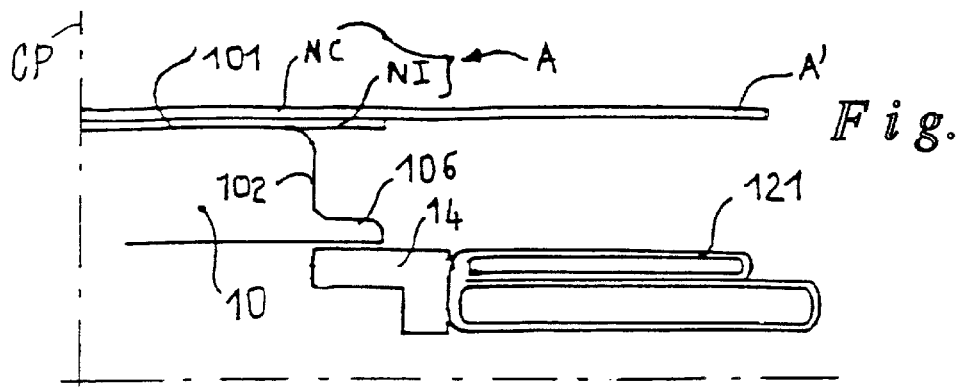
FIGS. 4A to 4J are schematic representations in partial axial section, showing the several phases in the manufacture of a tire with the apparatus according to the first embodiment of the invention.

According to FIG. 4A, the drum 10 being in working position and the side crown 14 in deployed position, that is, axially shifted, a sheet of rubber called "inner sheet" NI is laid on the main receiving surface 101, then a ply of textile cords called "casing ply" NC. The sheet and ply NI and NC form what is here collectively called "casing carcass" A. The end A' of the casing carcass A passes axially beyond the main receiving surface 101 and beyond the lateral protuberance 106 and the side crown 14, as well as and part of the folding membranes.

Figure 4B:
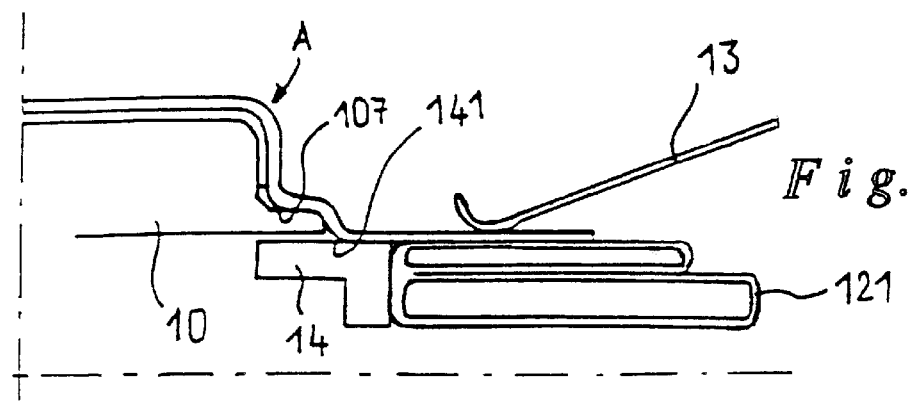

Then, the end A' of the casing carcass A is put down radially inward on respectively the support surface 107 of the lateral protuberance 106, the support surface 141 of the side crown 14, and partially on the membranes 121 with the aid of the depressor fingers 13, as shown in FIG. 4B.

According to a modification, the casing sheet may be placed under slight tension. The resulting shrinking tendency spontaneously causes a diametral shrinkage of the ends A', which may be supplemented by a flattening down as described above or a rolling down, for correct application of the said casing carcass to the receiving and support surfaces.

Figure 4C:
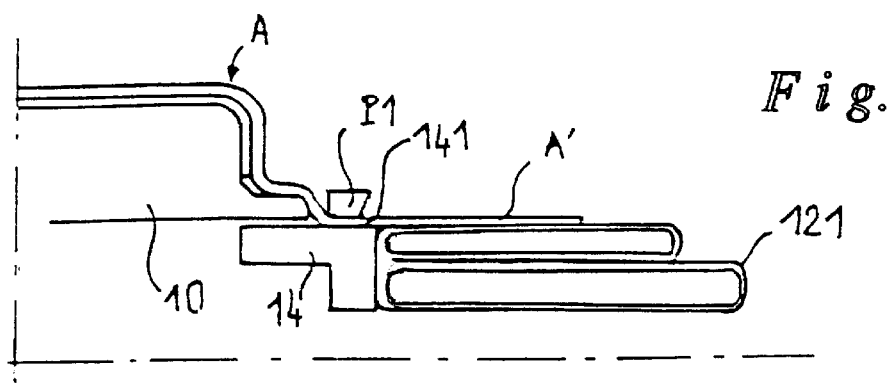

Then, as shown in FIG. 4C, a rubber composition section Pl is laid on the area of the end A' of the casing carcass A arranged on the support surface 141 of the side crown 14. This section P1, in the example described, has a quadrilateral shape, but sections of other shapes are possible. Advantageously, one may choose to make the section P1 of a rubber composition having a Mooney viscosity ML (1+4) at 100° C., measured according to Standard ASTM:D-1646, greater than or equal to 70, so that the section P1 will be sufficiently hard and to facilitate rotation of the end A' around said section P1.

Figure 4D:
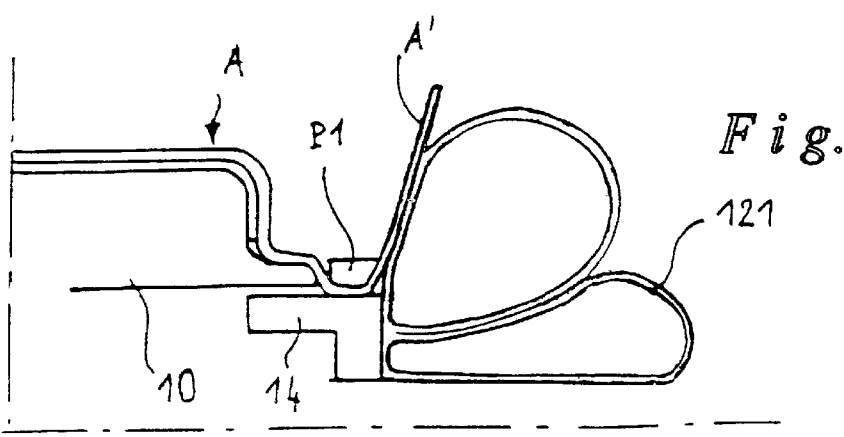
Figure 4E:
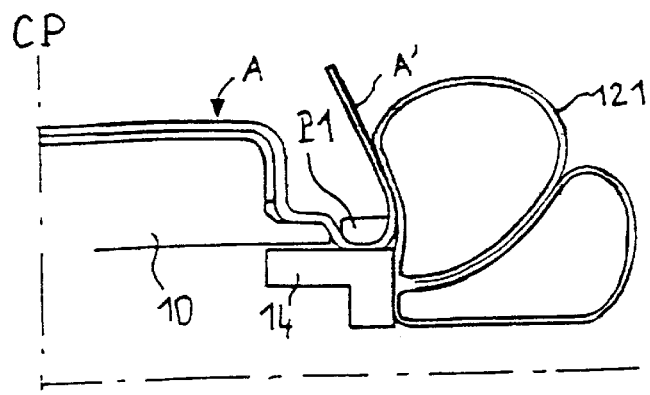

Then, the folding membranes are inflated, radially lifting the end A' located axially outside the side crown 14 and hence outside the section P1. Thus, the raised area of the end A' executes a rotation around the section P1 so that the latter is oriented substantially radially, as shown in FIG. 4D and 4E. Note in passing that at least the portion of the membranes 121 in contact with the casing carcass A is selected and/or treated so that the casing carcass A will not stick to said portion (for example, because its surface is covered with a suitable textile fabric).

Figure 4F:
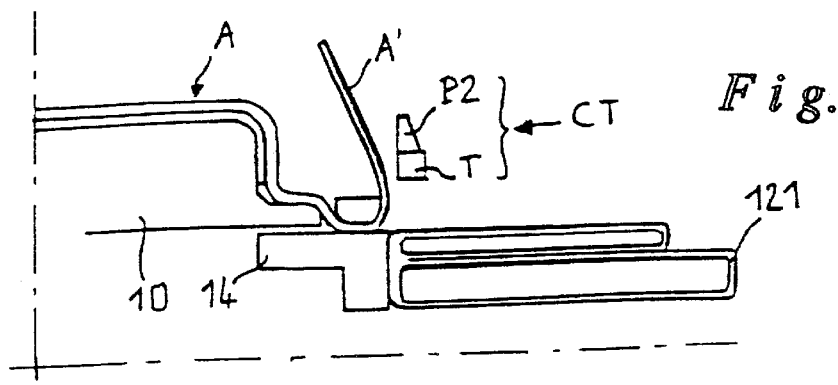

According to FIG. 4F, the folding membranes 121 are then deflated, the raised end A' remains in position oriented substantially radially, and a bead wire complex CT is approached axially by the bead wire complex approach means. The bead wire complex CT consists in this example of a bead wire T of a square cross-section made up of wires or cables, surmounted radially by a rubber composition section P2.

Figure 4G:
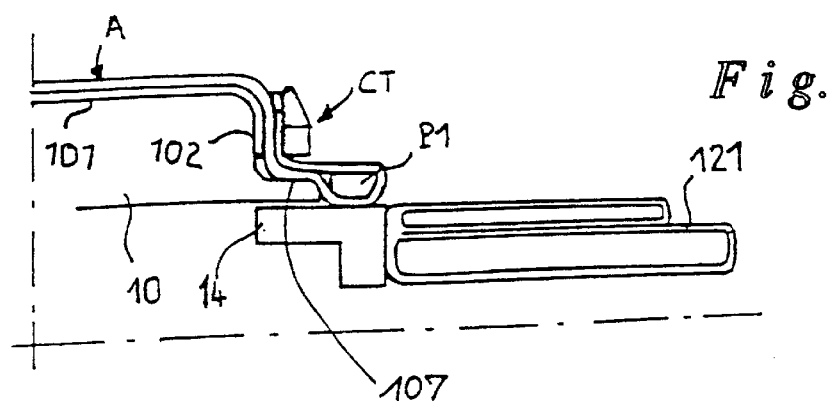

The bead wire complex CT is brought up axially until the end A' rests upon it. The axial approach of the bead wire complex CT is then continued, thus taking with it the end A', which is folded, passing over the section P1 covered by a portion of the end A'. The bead wire complex CT is then brought up into contact with the casing carcass A that is in contact with the shoulder 102 by way of the folded end A', which is thus between the bead wire T and the casing carcass A, as seen in FIG. 4G.

The placement of the bead wire complex CT on the fold of the end A' of the casing carcass A is thus vertical to the second coaxial cylindrical support surface 107, between the main receiving surface 101 and the first support surface 141 (or 141'), the diameter of the main receiving surface 101 being greater than what of the second support surface, which is greater in turn than the diameter of the first support surface (see also 741, 711, 751 below).

Figure 4H:
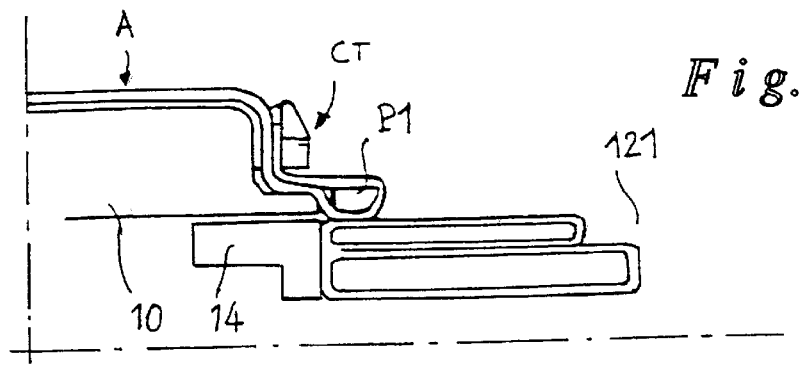
Figure 4I:
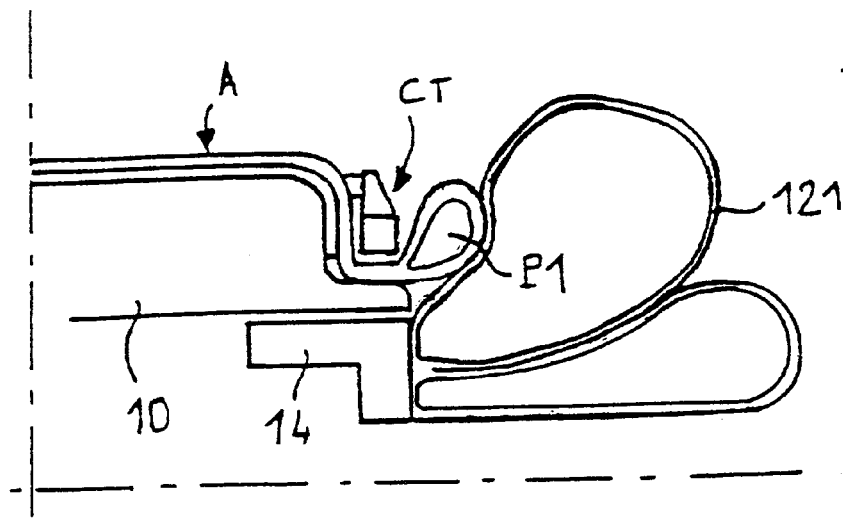

The side crown 14 is then axially shifted towards the center plane (CP), which retracts the first support surface 141 (141' in the variation shown in FIG. 3), under the lateral protuberance 106 so that the section P1, surrounded by the casing carcass A, is henceforth right above the folding membranes 121 (FIG. 4H).

The folding membranes 121 are inflated again, this time rocking the section P1 (FIG. 4I) against the bead wire complex, or at least lifting it radially somewhat relative to the bead wire complex CT, and helping to hold it laterally against the bead wire complex CT.

Figure 4J:
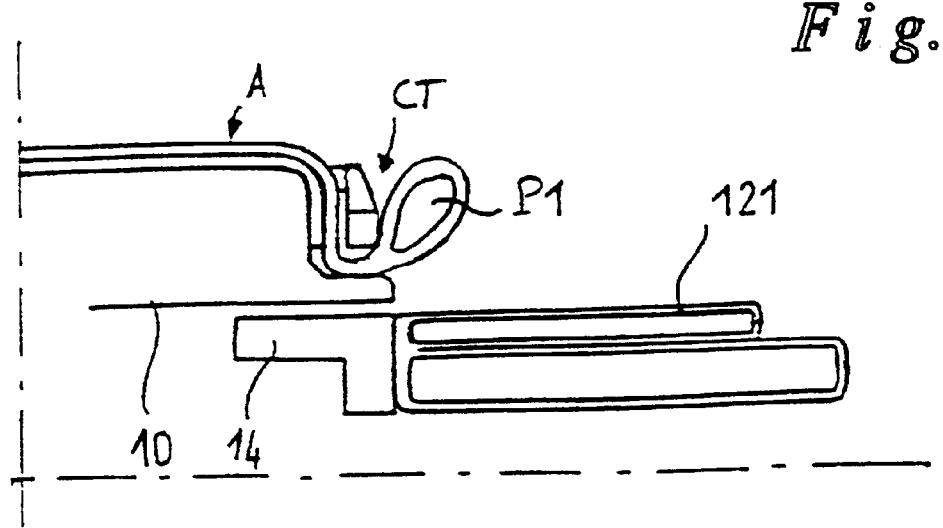

This step having been completed, the folding membranes 121 are deflated. The rough bead of the casing of lifted section P1 keeps its shape (FIG. 4J).

Then, the other products making up the tire are laid down, and it is vulcanized. The invention does not pertain to this part of the manufacture. Numerous methods are available to those skilled in the art, so that this aspect of manufacture need not be dwelt upon in the context of the present invention.

In the following, the same reference numerals will be used for components common to tire casings made by any of the apparatuses according to the invention.

The method according to the invention might also be practiced with apparatus comprising drums capable of expanding radially from a first working position and having shoulders to permit use of bead wire complexes placed on said shoulders.

Figure 5:
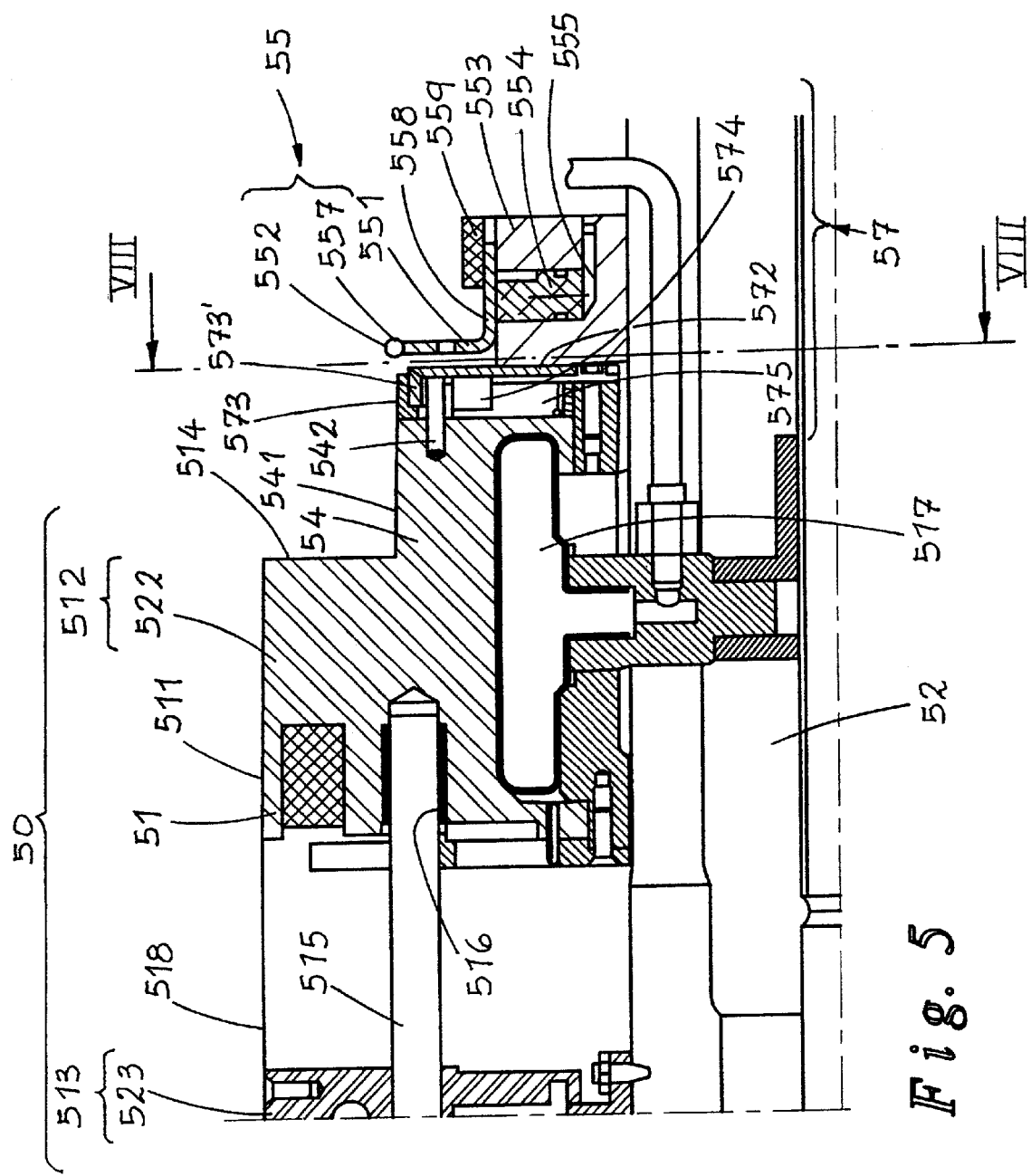
FIG. 5 is a partial axial section of an apparatus for tire manufacture according to a second embodiment of the invention.
Figure 6:
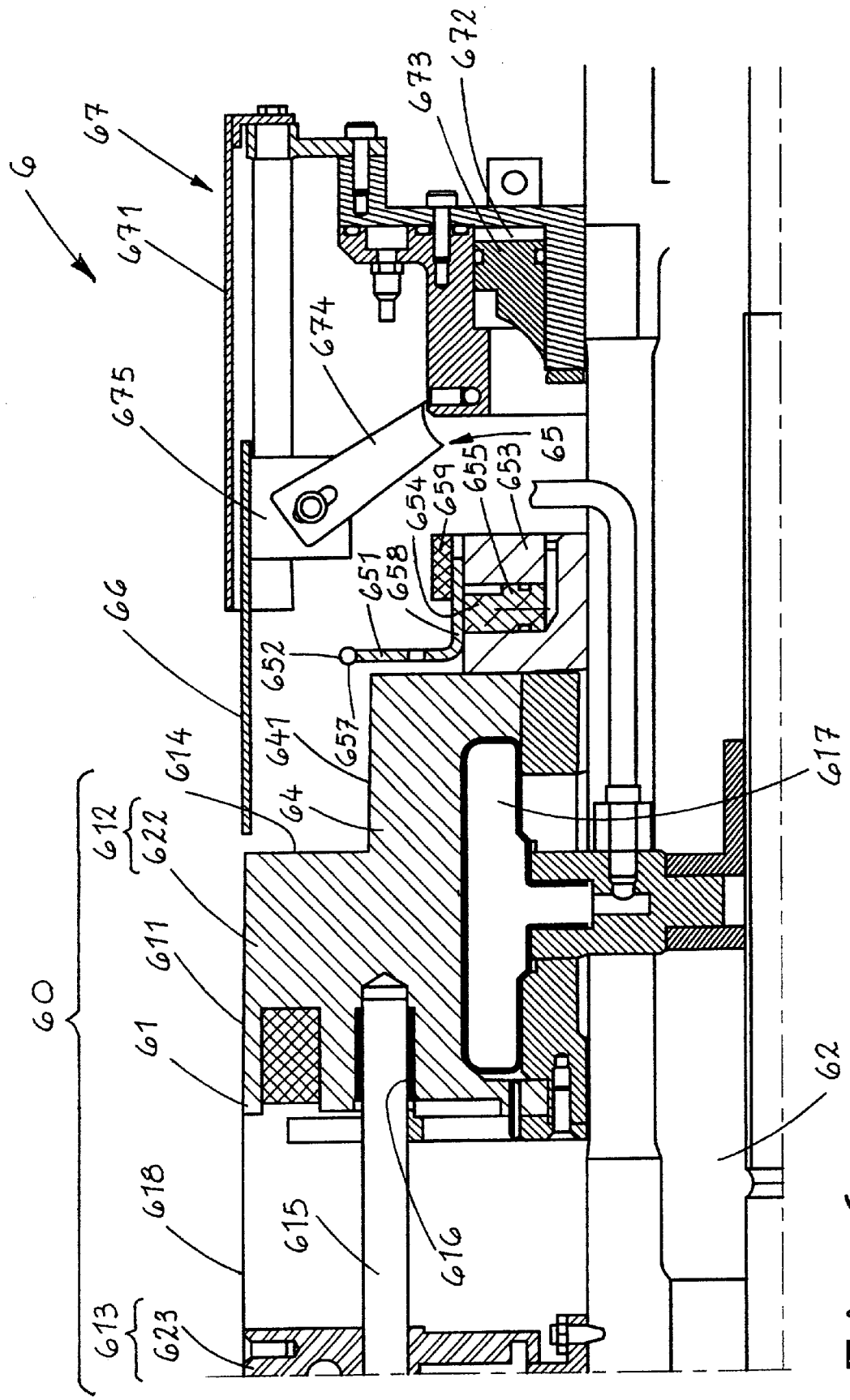
FIG. 6 is a partial axial section of an apparatus for tire manufacture according to a third embodiment of the invention.
Figure 7:
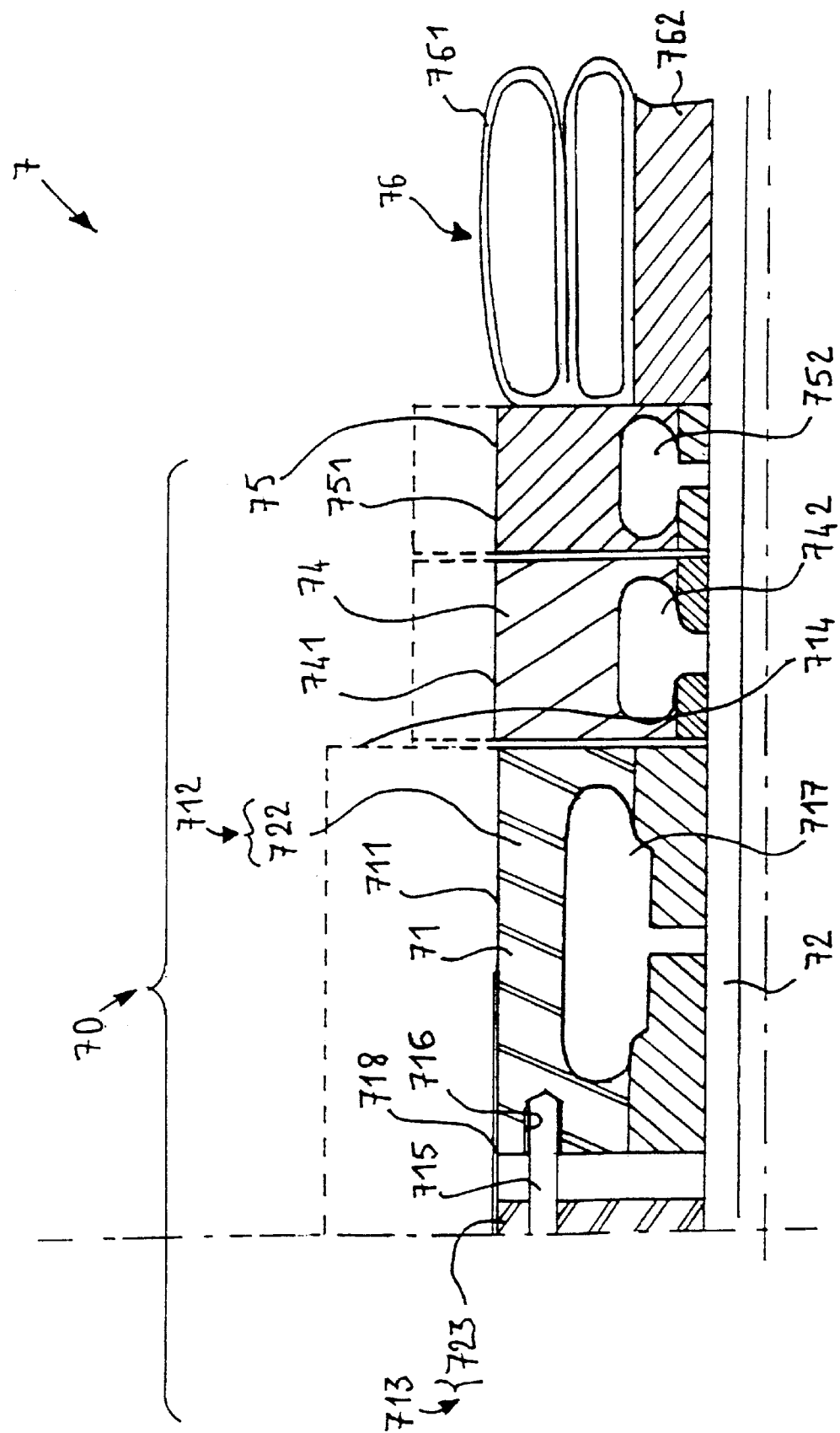
FIG. 7 is a partial axial section of an apparatus for tire manufacture according to a fourth embodiment of the invention.

Such apparatuses are shown in FIGS. 5, 6 and 7. These apparatuses will be respectively designated by references beginning with 5, 6 and 7.

The apparatuses 5, 6 and 7 respectively comprise an assembly drum 50, 60, 70, radially expansible, comprising a body 51, 61, 71 mounted on a shaft 52, 62, 72 having a receiving surface 511, 611, 711 for products to be assembled, and shoulders 514, 614, 714.

These apparatuses 5, 6, 7 likewise comprise a bead wire complex approach system not shown, axially displaceable towards the drum 50, 60, 70 while leaving clear the inside diameter of the bead wire complexes as described for the previous example. However, contrary to the previous example, the apparatuses 5, 6, 7 are used here without depressor fingers, as will be understood upon reading the process of fabrication employing these apparatuses.

The drums 50, 60, 70 described in this embodiment of the invention being symmetrical with respect to a plane CP shown in FIGS. 5, 6, 7, the following description will be confined to the half-drums located to the right of the plane CP in said figures. The choice of drums as here described does not limit the scope of the invention to the symmetrical drums.

The central body 51 (61, 71) comprises a half-body 512 (612, 712) axially displaceable around the shaft 52 (62, 72) to adjust the deviation of the bead wire of the tire to be made, and a central crown 513 (613, 713) fixed axially in relation to the shaft 52 (62, 72).

The half-body 512 (612,712) and the central crown 513 (613,713) comprise a plurality of side segments 522 (622, 722) and central segments 523 (623, 723) respectively facing. The side segments 522 (622, 722) are juxtaposed circumferentially around the shaft 52 (62, 72), and likewise the central segments 523 (623, 723) are juxtaposed circumferentially around the shaft 52 (62, 72). To connect the several parts of the body 51 (61, 71), each side segment 522 (622, 722) is guided in relation to the facing central segment 523 (623, 723) by means of a bar 515 (615, 715) one end of which traverses the central segment 523 (623, 723) and the other end of which is slidingly mounted in a bore 516 (616, 716) borne by the side segment 522 (622, 722), facing.

To allow the drum 50 (60, 70) to reach its expanded position, the segments 522 (622, 722) are movable radially under the action of an inflatable expansion chamber 517 (617, 717) arranged under said lateral segments 522 (622, 722). The side segments 522 (622, 722) bring with them in their radial motion the central segments 523 (623, 723) of the central crown 513 (613, 713), which are integral in radial displacement with the side segments 522 (622, 722), by way of the bars 515 (615, 715).

Plates 518 (618, 718) are fixed by screws not shown to the segments 523 (623, 723) of the central crown 513 (613, 713). These plates 518 (618, 718) at least partly cover the segments 522 (622, 722) of the half-body 512 (612, 712) to ensure continuity between the central crown 513 (613, 713) and said half-body 512 (612, 712) for the products to be assembled, regardless of the axial position of the half-body 512 (612, 712). The central crown 513 (613, 713) moreover serves to keep the plates 518 (618, 718) axial during the radial expansion of the drum 50 (60, 70). Of course, other components than expansion chambers might be conceived to achieve a radial expansion of the drum.

The receiving surfaces 511 (611, 711) for products to be assembled thus consist of the totality of exterior surfaces of the plates 518 (618, 718) and areas of the segments 522 (622, 722) not covered by said plates 518 (618, 718).

In the following, a more detailed description will be given, firstly, of the parts common to the apparatuses 5 and 6 with reference to FIGS. 5 and 6, followed by their specific features, and secondly, of the apparatus 7 with reference to FIG. 7.

The drum 50 (60) comprises a lateral protuberance 54 (64), expansible radially, integral with the body 51 (61) and having a support surface 541 (641) for the products to be assembled. The lateral protuberance 54 (64) is juxtaposed coaxially with the shoulder 514 (614) of the body 51 (61) and forms a support surface 541 (641) of smaller diameter than said main receiving surface 511 (611). A possible embodiment of the lateral protuberance 54 (64) consists in forming it with segments respectively prolonging the segments 522 (622) of the half-body 512 (612). Likewise, without departing from the scope of the invention, the lateral protuberance 54 (64) might be a built-up element on the body 51 (61).

The apparatus 5 (6) comprises a folding means 55 (65) mounted on the shaft 52 (62) axially outside of the lateral protuberance 54 (64). This folding means 55 (65) may consist, as in the example of apparatus 1, of folding membranes. For this example, a folding means 55 (65) comprising lifting fingers has been chosen, meaning by the term "finger" a member of small cross-section.

In FIGS. 5 and 6, the folding means 55 (65) is independent of the drum 50 (60) and may be displaced axially, but the means might also be integral with the drum 50 (60), in which case it is useful to employ the segments 522 (622) of the half-body 512 (612) as respective supports for the lifting fingers.

The folding means 55 (65) comprises a plurality of lifting fingers 551 (651) of rectangular cross-section (viewed radially), distributed circularly around the central shaft 52 (62) and extending in radial directions.

These lifting fingers 551 (651) are arranged axially outside in relation to the center of the drum 50 (60), at a short distance from the free end of the lateral protuberance 54 (64), and respectively present a contact surface 552 (652) for the products to be assembled. The lifting fingers 551 (651) are mounted capable of radial displacement respectively on a cylindrical support 553 (653), mounted axially displaceable on the central shaft 52 (62) by way of jacks 554 (654).

Thus, the radially inner end of the body 51 of each lifting finger 551 (651) bears a prolongation 558 (658) axially to which is fixed, by way of screws, the corresponding jack 554 (654), which slides radially in a recess 555 (655) borne by the cylindrical support 553 (653).

So the lifting fingers 551 (651) are deployable radially towards the outside of the drum 50 (60), from a rest position to a deployed position. And to ensure the return of the lifting fingers 551 (651) to rest position, an elastic restoring band 559 (659) surrounds the assembly of axial prolongations 558 (658).

These lifting fingers 551 (651) thus offer the products to be assembled a plurality of contact surfaces 552 (652), discontinuous and distributed circumferentially.

Advantageously, the free ends of the lifting fingers 551 (651), radially exterior, that is, to the drum 50 (60) consist of a roller 557 (657), mounted free to rotate on an axis and bearing the contact surface 552 (652). This roller 557 (657) serves to avoid creating stresses in products raised on deployment of the lifting fingers 551 (651), while ensuring a "rolling" contact between the fingers and said products in that phase.

According to FIG. 5, the drum 50 bears expansion means 57, comprising in particular the expansion chamber 517, to two distinct expanded positions, permitting its two positions to be reached successively. In this way, the drum is capable of assuming three distinct stable positions, characterized by three different circumferential developments of an imaginary ring rolled around the main receiving surface.

Various solutions are conceivable to achieve the two successive expansions of the drum 50. In the example chosen, the expansion means 57 comprise a control ring 572 mounted on a support ring 573, the two rings being mounted on a shaft 52 and arranged axially outside the body 51 near the free end of the lateral protuberance 54. For greater compactness, the support ring 573 has an inner cylindrical shoulder 573' cooperating with the control ring 572.

The control ring 572 is rotationally mounted relative to the body 51 of the drum 50, the support ring 573 being integral with said body 51 in rotation.

Figure 8:
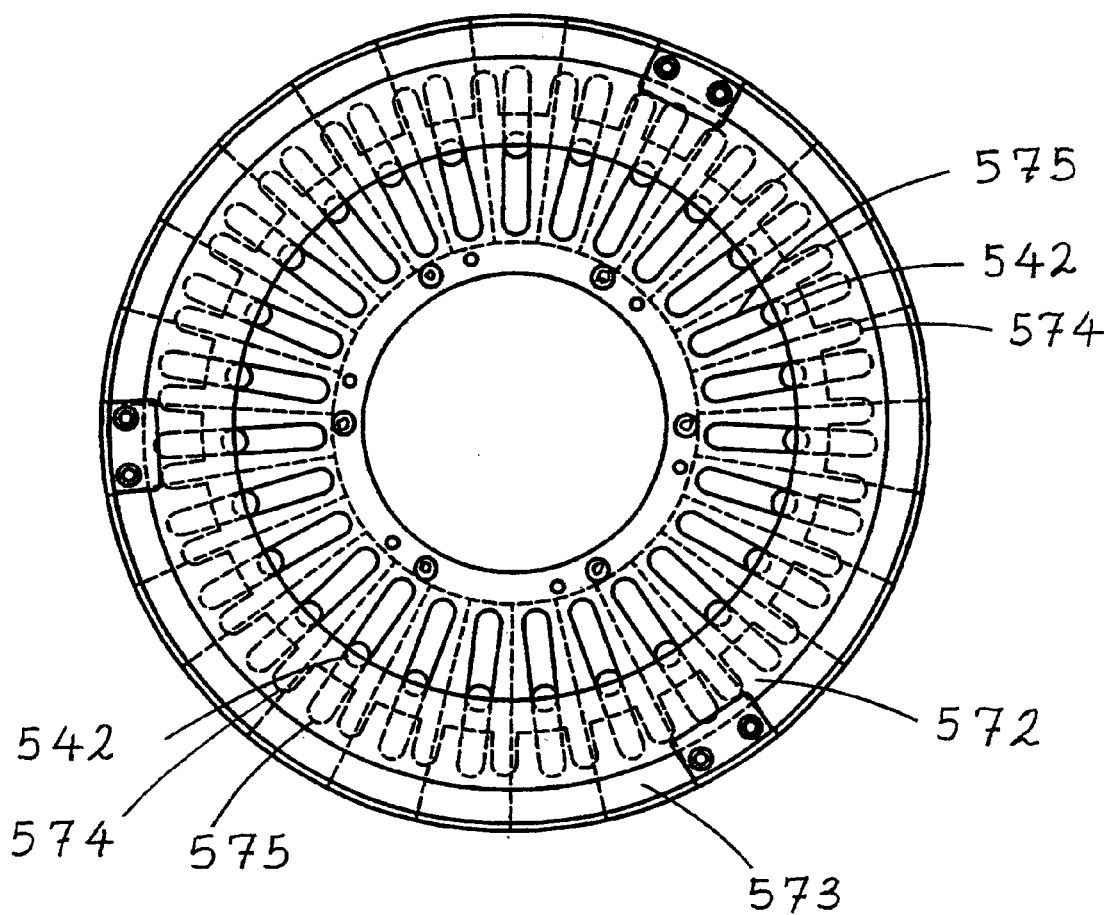
FIG. 8 is a cross section of the apparatus shown in FIG. 5 at line VIII in said FIG. 5.

As FIGS. 5 and 8 show, the lateral protuberance 54 bears at least one cam follower 542 engaging a cam 574 borne by the control ring 572 and simultaneously a hole 575 in radial direction in the support ring 573. In the example chosen, each of the segments constituting the lateral protuberance 54 bears a cam follower to engage a cam and a corresponding opening.

The expanded position accessible to the drum 50 is dependent on the angular position of the control ring 572. For according to the position of the control ring 572, and hence its angular position and that of the cams 574, the engagement cam follower 542 have a different range of radial positioning, thus limiting the radial expansion of the drum 50, the openings 575 serving to guide the engagement cam follower 542.

The angular rotation of the control ring 572 is obtained by use of an actuating jack not shown. In FIG. 8, each cam 574 has a Z-like shape, the possible positions of the engagement cam follower 542 corresponding on each side of the Z to the three positions of the drum 50, that is, a retracted position, an intermediate expanded position and a maximal expanded position.

Without departing from the scope of the invention, one may examine elements other than the expansion chambers 517 to obtain a radial expansion of the drum 50. The system subjecting the radial position of the drum 50 to the circumferential positioning of the control ring 572 is not bound to the choice of expansion chambers 517.

One might consider using a single control ring—support ring assembly. However, use of two will be preferred, one at each end of the drum body, to ensure good synchronization of expansion between the two ends of the drum.

As will be better understood upon reading about the operation of this apparatus 5, the folding means 55 is so made that the contact surfaces 552 of the lifting fingers 551 substantially form a cylindrical surface coaxial with the shaft 52, whose diameter is:

In position of rest of said fingers, less than or equal to the diameter of the support surface 541 of the lateral protuberance 54 in the intermediate expanded position of the drum 50, And in expanded position, greater than the diameter of the support surface 541 of the lateral protuberance 54 in the intermediate expanded position of the drum 50.

FIGS. 10A to 10G schematically illustrate this process in the second embodiment of the invention, using the apparatus 5.

Figure 10A:
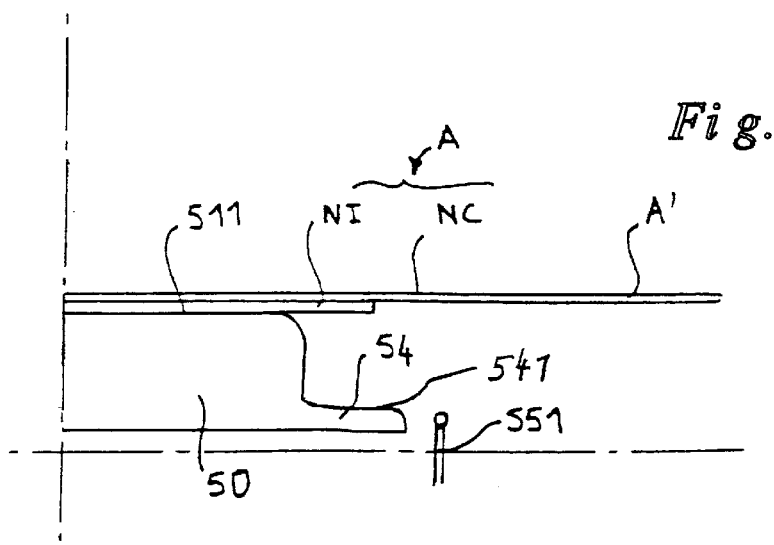
FIGS. 10A to 10G are schematic representations in partial axial section illustrating the several phases of the manufacture of a tire with the apparatus according to the second embodiment of the invention.

In FIG. 10A, the drum 50 being in contracted position, the sheet NI and the ply NC are laid on the receiving surface 511, forming the casing carcass A. The end A' of the casing carcass passes axially beyond the receiving surface 511 and covers the lateral protuberance 54 as well as the lifting fingers 551 of the folding means 55.

Figure 10B:
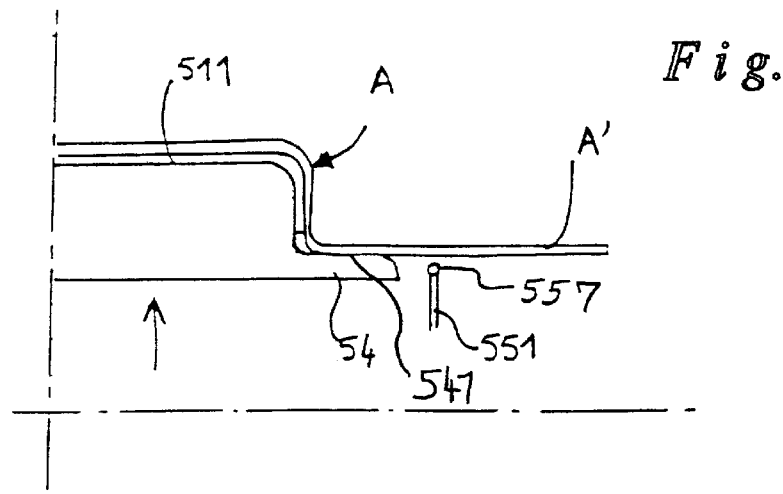

Then in FIG. 10B, the end A' of the casing carcass A is put down respectively on the support surface 541 of the lateral protuberance 54, effecting a first expansion of the drum 50, for example, by virtue of the control ring 572 and the support ring 573. The expansion of the drum 50 in intermediate position serves to place the end A' on the support surface 541, and that formed by the contact surfaces 557 of the folding means 55.

Figure 10C:
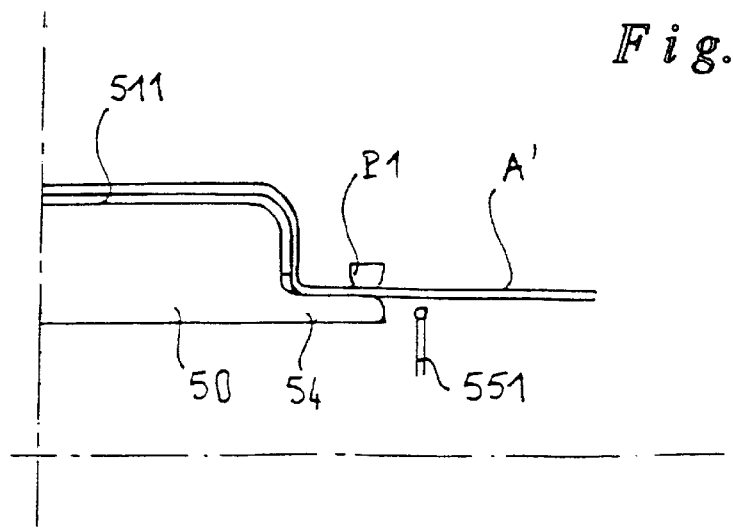

Then, as shown in FIG. 10C, the rubber composition section P1 is laid on the zone of the end A' of the casing carcass A laid on the support surface 541 of the lateral protuberance 54.

Figure 10D:
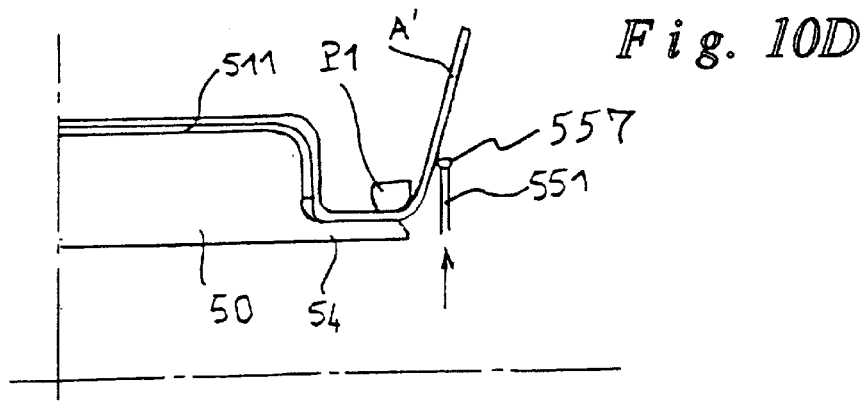

Now the lifting fingers 551 are deployed radially to the deployed position, in which the contact surfaces 557 substantially form a cylindrical surface of greater diameter than the support surface 541, so that the fingers 551 radially lift the end A' located axially outside the lateral protuberance 54 and hence outside the section P1. Thus the raised area of the end A' executes a rotation around the section P1, so that the latter is oriented substantially radially, as shown in FIG. 10D.

Figure 10E:
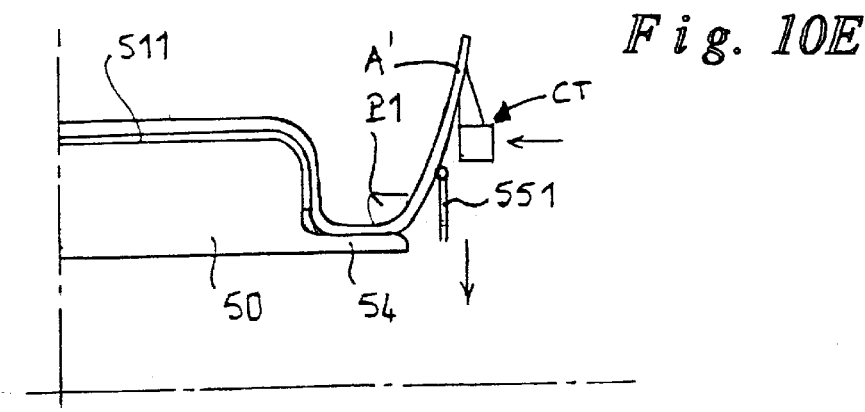

According to FIG. 10E, with the lifting fingers 551 still in deployed position, the bead wire complex CT is approached axially, by means of the bead wire complex approach device, until the end A' rests upon it.

Figure 10F:
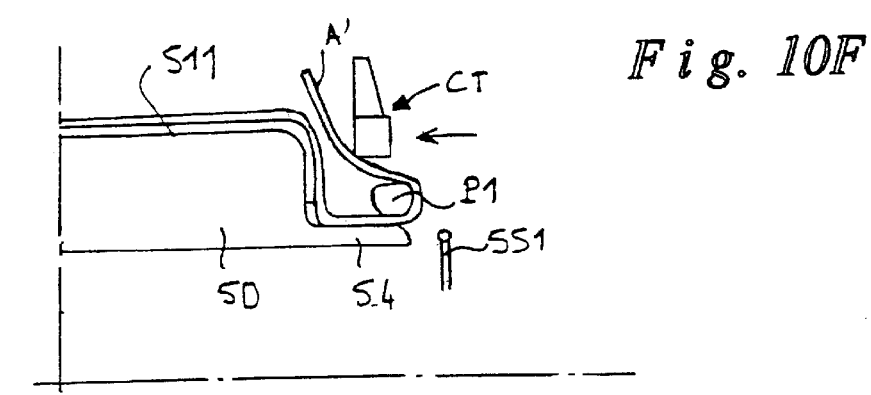
Figure 10G:
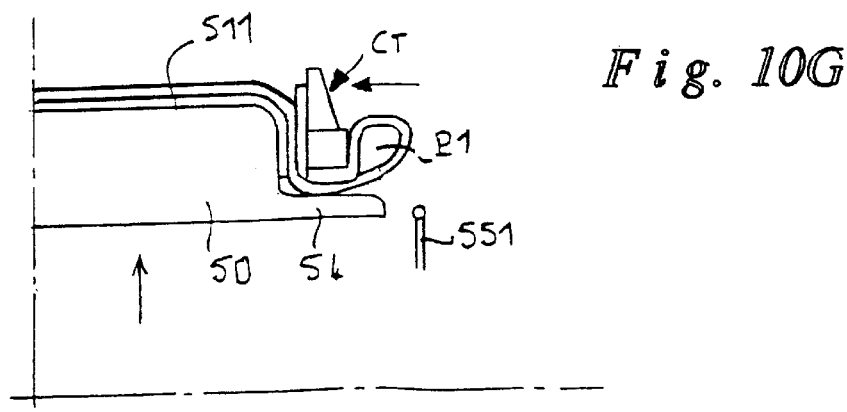

The lifting fingers 551 may be brought back into rest position with the aid of the elastic band 559, and the axial approach of the bead wire complex CT is continued, bringing with it the end A', which is thus folded, passing over the section P1 covered by a portion of the end A', as is seen in FIG. 10F. However, note that the fingers 551 may be brought back alternatively before the end A' rests on the bead wire complex.

Then, simultaneously with the advance of the bead wire complex CT, the drum 50 is brought into its maximum expanded position, for example by actuating control ring 572 to a maximal position. The radial expansion of the support surface 541 resulting therefrom radially raises the section P1 in relation to the bead wire complex CT (see FIG. 10G).

As to the apparatus 6, besides the elements already described (namely the drum 60, the shaft 62, the lateral protuberance 64 integral with the drum 60, and the folding means 65), it comprises an axially movable collar 66, for example mounted on the shaft 62.

This collar 66 has substantially the same diameter as the receiving surface 611, and is mounted, displaceable relative to the shaft 62, between a retracted position and a position covering the surface 641 of the lateral protuberance 64, in which the collar 66 covers the said surface 641, as shown in FIG. 6. As will be seen more specifically in the description of the operation of the apparatus 6, the presence of the collar 66 provides a firm support for laying down a section of rubber composition.

The collar 66 is borne by a support 67 mounted on the shaft 62. The support 67 comprises an outer ring 671 concentric with the shaft 62 and covering the collar 66 in its retracted position. The diameter of the outer ring 671 is taken as close as possible to that of the collar 66, to allow the bead wire complex to pass over the outer ring.

The support 67 is mounted axially displaceable on the shaft 62, especially to facilitate operation of dismantling or gaining access to the drum 60.

Figure 9:
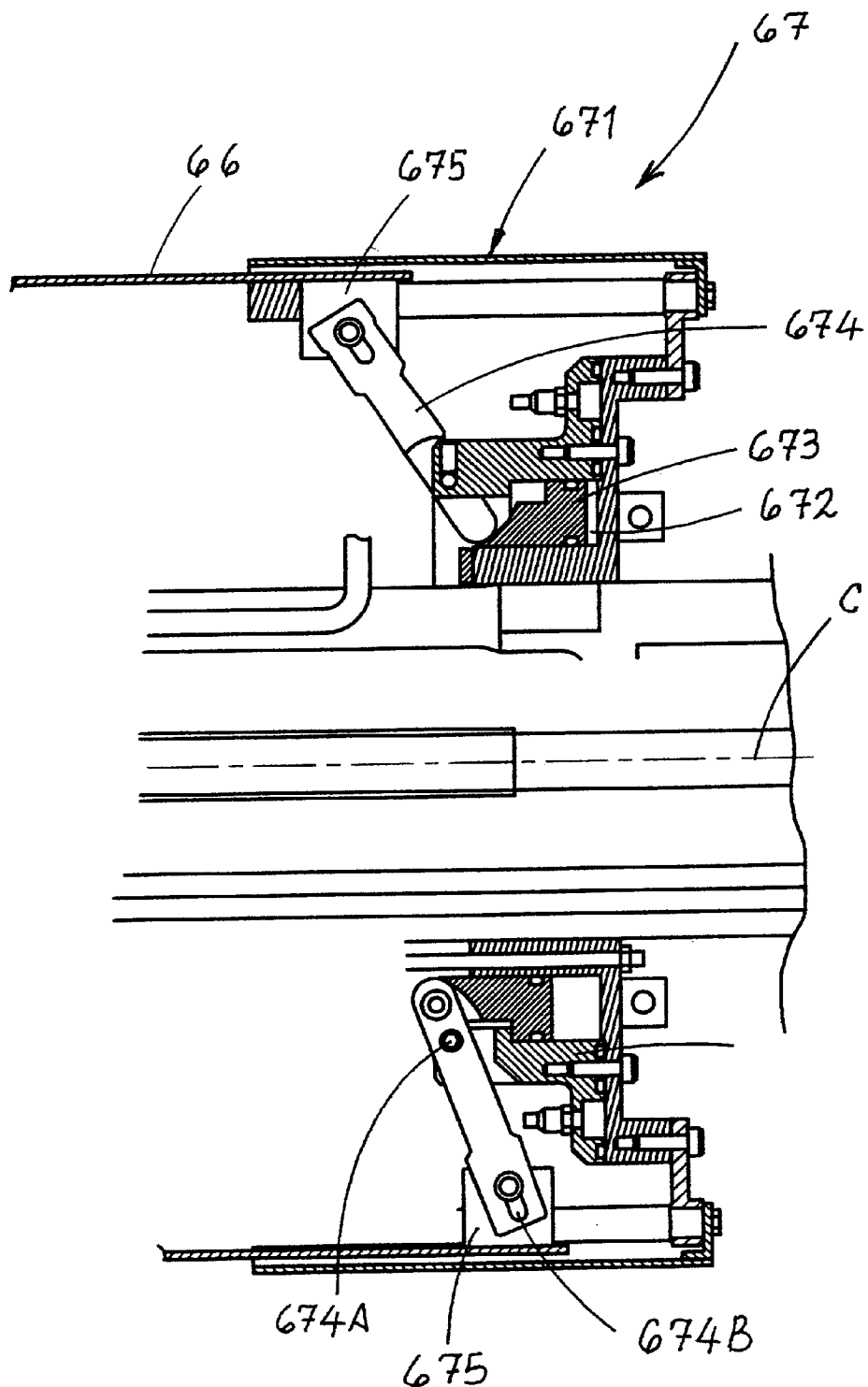
FIG. 9 is a partial axial section of an apparatus as illustrated in FIG. 6, shown in a different configuration.

At its lateral end away from the drum 61, the support 67 bears an annular chamber 672 concentric with the shaft 62, in which a piston 673 actuating the collar 66 connected to the latter by a connecting rod 674, slides axially, mounted to rotate around the shaft 674A, mounted in turn on the bearing 67. The connection of the connecting rod 674 with the collar 66 is effected by installation of a shaft integral with a bearing 675, said shaft entering an elongated aperture 674B made at one end of the connecting rod 674. The bearing 675 also slides in relation to the outer ring 671, which guides the collar 66 in translation. The other end of the connecting rod 674 cooperates with the piston 673 which drives the rocking motion of the connecting rod (for example by a roller engaged in a cam integral with the piston 673). The reader is referred to FIG. 9, the upper portion of which shows the collar in the same position that it occupies in FIG. 6, and the bottom portion of which shows the connecting rod 674 swung over and the collar 66 retracted under the outer ring 671.

The drum 60 has only two working positions in this examples: a retracted position corresponding to the deflated position of the expansion chamber of the inflation envelopes 617 and an expanded position corresponding to the inflated position of the expansion chamber 617. Note, however, that in an asymmetrical embodiment of the apparatus to make a tire with two beads of different diameters and consequently an assembly with two crowns of different diameters, integral with the drum, it is helpful to provide an expansion means on the drum, serving to obtain two successive expansion positions, so that this difference in diameter could be handled in manufacture.

In this embodiment, it is preferred to employ a folding means using lifting fingers 651 as previously described rather than folding membranes. For as will be shown in more detail in the description of the process, the folding means must be capable of considerable radial displacement, which is more conveniently achieved with lifting fingers.

This folding means 65 is made so that the contact surfaces 652 of the lifting fingers 651 substantially form a cylindrical surface coaxial with the central shaft 62, whose diameter is:
  In rest position of said fingers, less than that of the receiving surface 611 in contracted position of the drum 61, to allow deployment of the collar 66,
  And in deployed position, greater than that of the receiving surface 611 in contracted position of the drum 61.

FIGS. 11A to 11G schematically illustrate this process in the third embodiment of the invention using the apparatus 6.

Figure 11A:
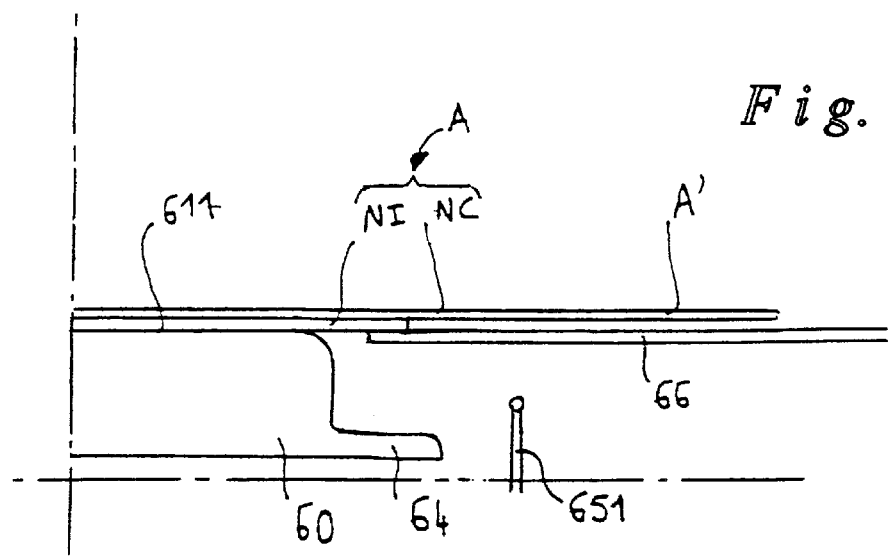
FIGS. 11A to 11G are schematic representations in partial axial section of the several phases of manufacture of a tire with the apparatus according to the third embodiment of the invention.

According to FIG. 11A, the drum 60 being in contracted position and the collar 66 in transversely advanced position covering the lateral protuberance 64, the sheet NI and the ply NC are laid on the receiving surface 611, forming the casing carcass A, the end A' of the casing carcass A resting on the collar 66. At this stage, the collar 66 is not essential for laying the casing carcass A, as is shown by the preceding examples.

Figure 11B:
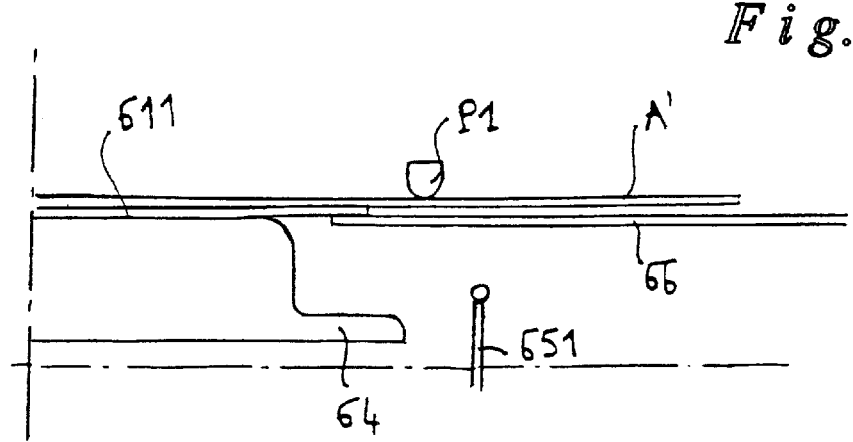

Then in FIG. 11B, the rubber composition section P1 is laid on the zone of the end A' of the casing carcass A laid on the collar 66. It is at this step that it is highly advantageous to have a support under the end A' of the casing carcass A.

Figure 11C:
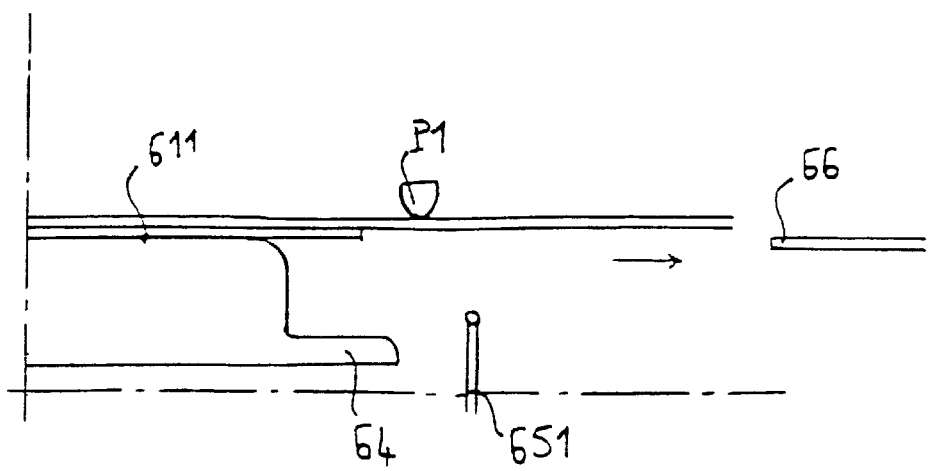

Then, the collar 66 is retracted under the outer ring 67 the end A' bearing the section P1 alone remaining in position as shown in FIG. 11C.

Figure 11D:
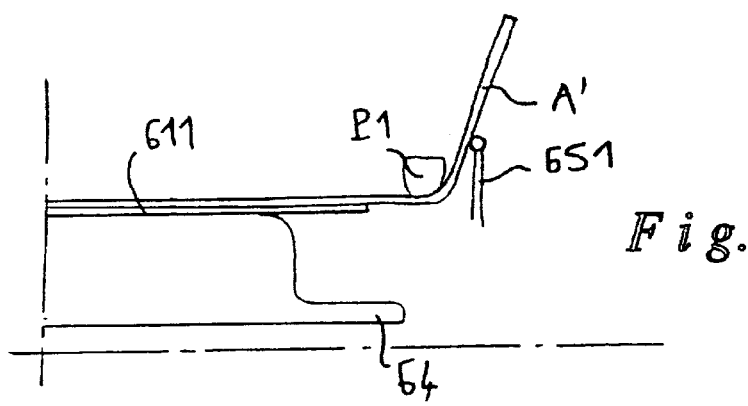

Then, the lifting fingers 651 are deployed radially, radially lifting the end A' located axially outside of the lateral protuberance 64 and hence of the section P1. Thus, the raised area of the end A' executes a rotation around the section P1 so that it is oriented substantially radially, as shown in FIG. 11D.

Figure 11E:
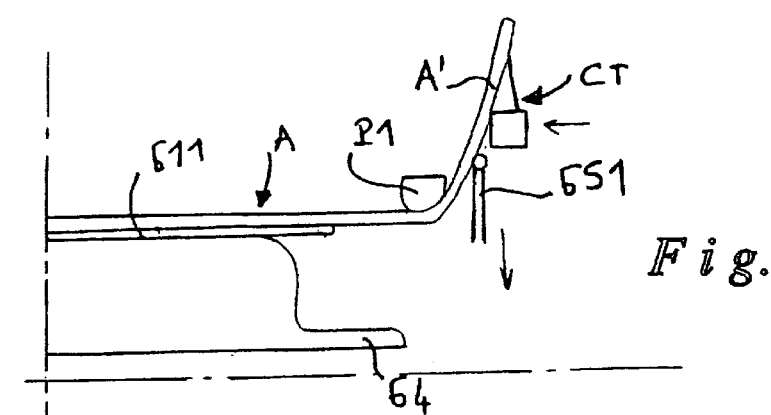

According to FIG. 11E, with the lifting finger 651 still in deployed position, the bead wire complex CT is brought axially, with the bead wire complex approach means, until the end A' is resting thereon.

Figure 11F:
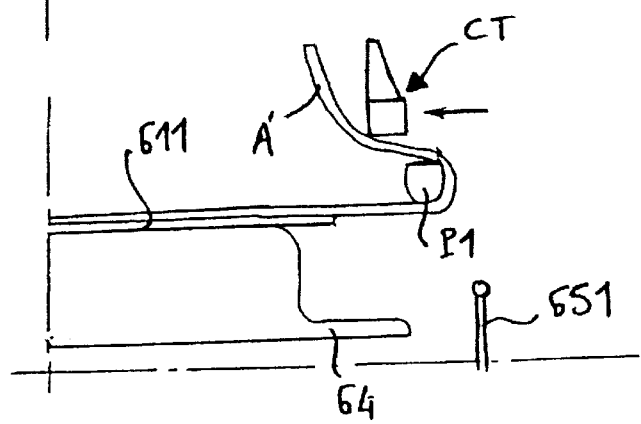

The lifting fingers 651 can be restored to rest position with the elastic band 659, and then the axial approach of the bead wire complex CT is continued, bringing with it the end A', which is thus folded, and passing it over the section P1 covered by a portion of the end A', as is seen in FIG. 11F.

Figure 11G:
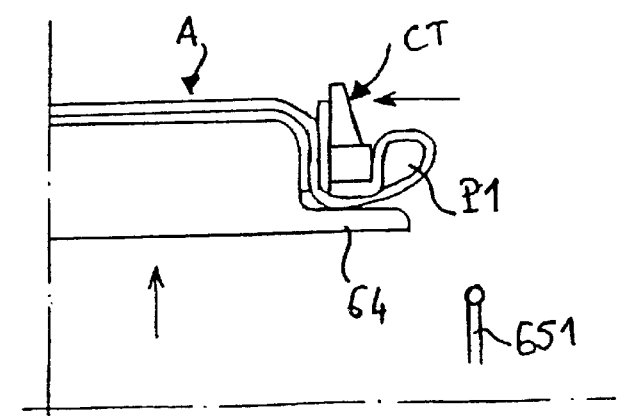

Then, the axial approach of the bead wire complex CT and the inflation of the expansion chamber 617 are synchronized first to bring the drum 60 into its maximum expanded position, radially lifting the second support surface 641 and expanding the section P1 in relation to the bead wire complex CT (see FIG. 11G).

Lastly, the following will describe the specific features pertaining to the apparatus 7 with reference to FIG. 7, the body 71 of the drum 70 having already been described earlier.

The drum 70 likewise comprises a first crown and an intermediate crown mounted on the shaft 72, namely 75 and 74 respectively, the intermediate second crown 74 being arranged between one of the shoulders 714 of the body 71 (showing clearly in expanded position of said central body 71) and the first crown 75. Each of the first crown 75 and intermediate crown 74 has a support surface for products to be assembled, to be called the first support surface 751 for the first crown and the second support surface 741 for the intermediate crown 74.

The two crowns 74, 75 are integral in axial translation with the body 71 and radially expansible individually and independently of said body, by virtue of an expansion chamber 742 and 752, respectively. Other expansion means than the chambers cited above may conceivably be used.

The outside diameters of the first crown and the intermediate crown 75, 74, that is, the diameters of the first and second support surfaces 751, 741 in retracted position of the crowns 75, 74, are substantially the same as the diameter of the receiving surface 711 in retracted position of the central body 71, and the diameter of the first support surface 751 in expanded position of the crown 75 is less than the diameter of the second support surface 741, likewise in expanded position of the intermediate crown 74, which is itself less than the diameter of the receiving surface 711 in expanded position of the central body 71.

Note that in an asymmetrical embodiment of the apparatus 7 to make a tire having two beads of different diameters, the outside diameters of the first and intermediate crowns will be different to the right and left of the plane CP.

The apparatus 7 comprises a folding means 76 mounted on the shaft 72 axially outside of the first crown 75. This folding means 76 may consist, as in the previous examples, of folding membranes or lifting fingers. For this example, folding membranes 761 have been selected, borne by a support 762 mounted axially translatable on the shaft 72.

FIGS. 12A to 12F schematically illustrate this process in the fourth embodiment of the invention using the apparatus 7.

According to FIG. 12A, the central body 71 and the two crowns 75 and 74 being respectively in retracted position, the sheet NI and the ply NC are laid on the receiving surface 711, forming the casing carcass A, the end A' of the casing carcass A resting on the first and second support surfaces 751 and 741 of the crowns 75, 74 and extending axially outside of them.

According to FIG. 12B, the expansion successively of the central body 71 and of the intermediate crown 74 is made, so that two "stair-steps" are created for the casing carcass A on which it is applied.

Then, the rubber composition section P1 is laid on the end area A' of the casing carcass A laid on the first support surface 751 as shown in FIG. 12C.

Figure 12D:
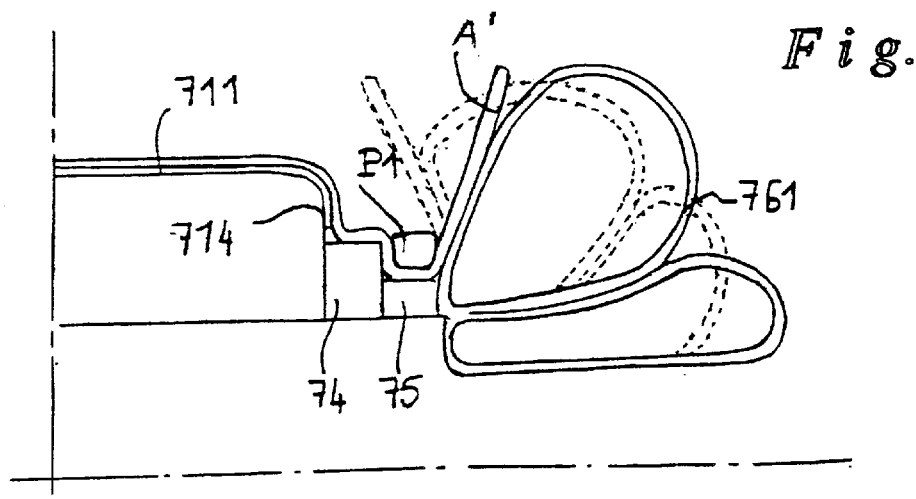

Then, the folding membranes 761 are deployed radially, radially lifting the end A' located axially outside of the first crown 75 and hence of the section P1. Thus, the lifted area of the end A' executes a rotation around the section P1 so that the latter is oriented substantially radially, as shown in FIG. 12D.

Figure 12E:
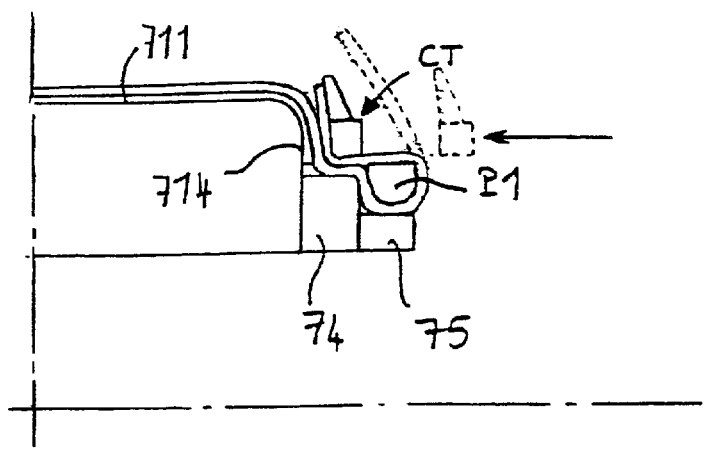

Then the folding membranes 761 are deflated, and with the bead wire complex approach means, the bead wire complex CT is moved axially until the end A' rests upon it. The axial approach of the bead wire complex CT is then continued, bringing with it the end A', which is thus folded, and passes beyond the section P1 covered by a portion of the end A'. The bead wire complex CT is thus brought closer until contact with the shoulder 714 by way of the folded end A' which is thus located between the bead wire T and the casing carcass A, as is seen in FIG. 12E.

Figure 12F:
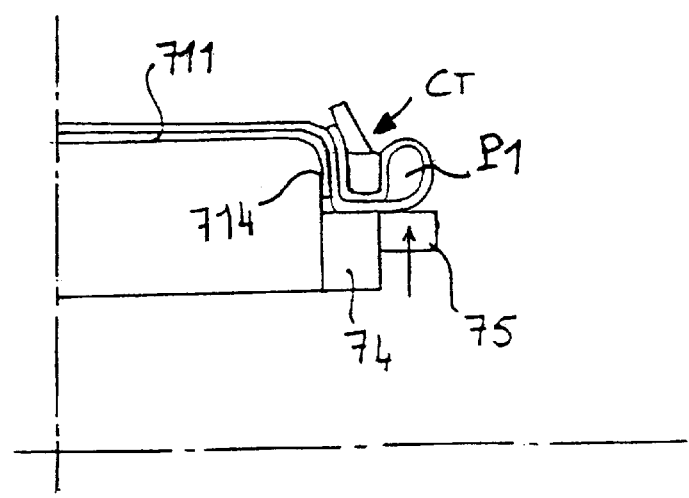

Then, the expansion chamber 752 is inflated to bring the first support surface 751 bearing the section P1 to the same diameter as the second support surface bearing the bead wire complex CT, radially lifting the section P1 in relation to the bead wire complex CT (see FIG. 12F).

We claim:

1. A process for manufacturing a tire, comprising the following steps:

laying a casing carcass on a generally cylindrical main receiving surface, at least one of the side ends of the casing carcass being laid radially outward to a first cylindrical support surface coaxial with the main receiving surface, laying a rubber composition section on said end of the casing carcass, folding said end of the casing carcass around the rubber composition section while keeping said section substantially stationary, placing a bead wire complex on the fold thus made, axially to the interior of the place where said section is laid.

radially dilating the rubber composition section covered by said fold of said end of the casing carcass with respect to the bead wire complex.

2. A process according to claim 1, wherein the other one of the side ends of the casing carcass is laid radially outward to another first cylindrical support surface arranged axially on the other side, and wherein said another first cylindrical support surface is coaxial with and of smaller diameter than the main receiving surface.

3. A process according to claim 1, wherein the folding of the end of the casing carcass around the rubber composition section is accomplished by:

radially lifting the said end so that it is substantially oriented radially, then bringing the bead wire complex axially closer towards the center of the casing carcass until the substantially radially oriented end rests on the bead wire complex, continuing the axial approach of the bead wire complex, passing over the rubber composition section.

4. A process according to claim 3, wherein the end of the casing carcass is lifted radially by pressing radially outward in an area of said end located axially outside of the rubber composition section.

5. A process according to claim 1, wherein the placement of the bead wire complex on the flap of the end of the casing carcass is made vertically to a second coaxial cylindrical support surface arranged between the main receiving surface and the first support surface, the diameter of the main receiving surface being greater than that of the second support surface, itself greater than the diameter of the first support surface.

6. A process according to claim 5, wherein the radial dilatation of the rubber composition section in relation to the bead wire complex is accomplished by:

retracting the first support surface, actuating a folding device arranged under the rubber composition section covered by the flap of the casing carcass.

7. A process according to claim 6, in which the dilation of the rubber composition section in relation to the bead wire complex is accomplished by performing an expansion of the first support surface as far as the diameter of the second support surface.

8. A process according to claim 1, wherein the radial dilation of the rubber composition section in relation to the bead wire complex is accomplished by an expansion of the receiving surface, the first support surface being integral with the receiving surface and of smaller diameter than that of said receiving surface.

9. A process according to claim 1, wherein the folding of said end of the casing carcass around the rubber composition section is preceded by an operation of retracting the first support surface and supplemented by radially dilating the rubber composition section covered by said fold of said end of the casing carcass in relation to the bead wire complex by causing an expansion of the receiving surface simultaneously with an expansion of a second support surface for said fold of said end of the casing carcass.

10. A process according to claim 1, further including the step of flipping said end of the casing carcass radially inward.

11. A process according to claim 1, wherein the placement of the bead wire complex on said fold of said end of the casing carcass is accomplished radially outward to a second coaxial cylindrical support surface arranged between the main receiving surface and the first support surface, the diameter of the main receiving surface being greater than that of the second support surface, and the diameter of the second support surface being greater than the diameter of the first support surface; and wherein the radial dilation of the rubber composition section with respect to the bead wire complex is accomplished by performing an expansion of the first support surface to a diameter equal to that of the second support surface.

* * * * *